Nov. 16, 1954     F. L. KNAB, SR     2,694,644

METHOD OF MAKING MARZIPAN ROSES

Filed Sept. 5, 1952

INVENTOR.
FRED L. KNAB. SR.

BY

McMorrow, Berman & Davidson
ATTORNEYS.

United States Patent Office 2,694,644
Patented Nov. 16, 1954

2,694,644

METHOD OF MAKING MARZIPAN ROSES

Fred L. Knab, Sr., Palos Park, Ill., assignor to Albert Knab and Fred Knab, Jr., both of Chicago, Ill.

Application September 5, 1952, Serial No. 308,039

4 Claims. (Cl. 99—138)

This invention relates to a method of making marzipan roses for use in cake decoration.

Marzipan roses are excellent for use in cake decorations, and are much preferred over the butter cream roses because they do not stick to the packing and do not turn rancid, as do the butter cream roses. By virtue of the marzipan roses not sticking to the packing and being substantially immune to rancidity they may be taken off of the cake and retained for souvenirs indefinitely. However, marzipan roses have not gone into extended use because, as heretofore proposed, they are made individually and by the aid of a modeling stick, requiring great skill and an undue expenditure of time of the baker.

An object of the present invention is to provide a method of making marzipan roses which enables the production of such roses with facility and ease.

Another object of the present invention is to provide a method of making marzipan roses whereby such roses may be produced in a simple and an expeditious manner.

Figure 1:
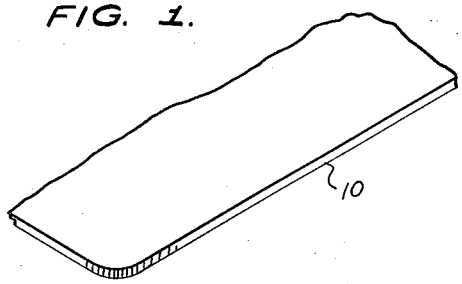
Figure 2:
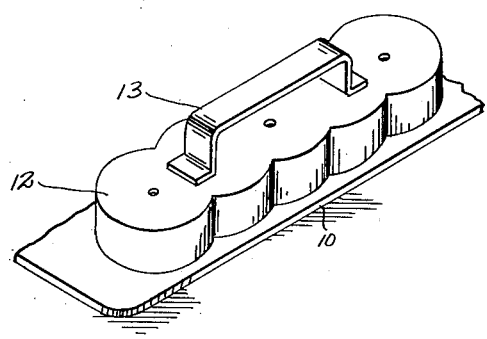
Figure 7:
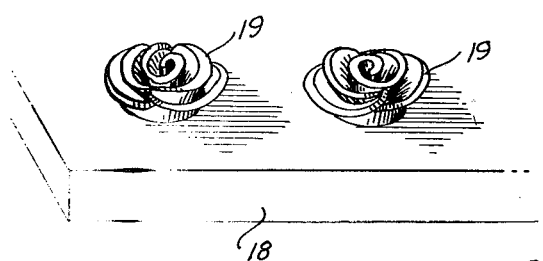

Other objects and advantages of the method of the present invention will become apparent from the following description taken in conjunction with the accompanying drawing, in which:

Figure 1 is a fragmentary perspective view of a sheet of edible cake decorative paste of the type employed in the making of marzipan roses according to the method of the present invention;

Figures 2 to 6 inclusive are views in perspective showing the steps of the method of the present invention for forming severed coil portions from the sheet of Figure 1;

Figure 7 is a perspective view showing the marzipan roses produced by the practice of the method of the present invention.

With reference to the drawing, the numeral 10 designates a fragmentary portion of a sheet made of edible cake decorative paste of the type employed in the making of marzipan roses. In forming such sheet a paste is first made by mixing two parts of powdered sugar with one part of almond or kernel paste, and incorporating in the mixed mass a quantity of white "Karo" syrup just sufficient to form a paste which does not stick to a rolling pin when rolling out the paste into a sheet. The paste, thus made, is then rolled out into the sheet by means of a rolling pin to the desired thickness.

Figure 3:
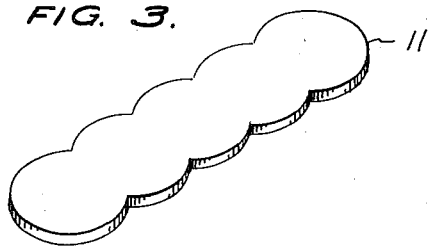
Figure 4:
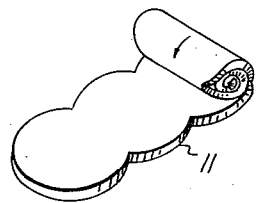

A strip having its side edges scalloped, as indicated by the numeral 11 and shown in Figure 3, is cut from the sheet 10. This is done by placing a cutter 12 of the type shown in Figure 2 upon the sheet 10 and applying pressure to the handle 13 of a magnitude sufficient to cause the cutter to completely pass through the sheet and sever the strip 11 from the sheet. After severence, the cutter 12 carrying the severed strip 11 is withdrawn from the sheet 10 and the strip 11 removed from the cutter 12 and placed in the position illustrated in Figure 3. The strip 11 is then rolled backwardly as shown in Figure 4 in the direction indicated by the arrow in such figure to form a coil 14 having a plurality of convolutions 15, Figure 5.

Figure 5:
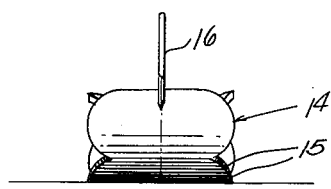
Figure 6:
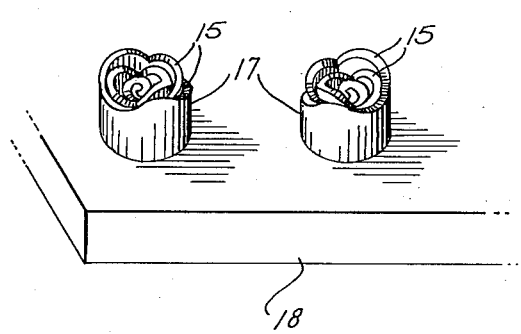

The coil 14 is then severed transversely intermediate the ends thereof by means of a cutter 16, Figure 5, to form two coil portions. Each of the two coil portions 17, Figure 6, are then rested upon the severed end upon a supporting surface 18, and while supported on such surface the convolutions 15 of each coil portion 17 are spread laterally and in succession to form a marzipan rose 19, as illustrated in Figure 7.

The marzipan roses thus produced do not become rancid, may be readily handled without sticking to the hands of the handler, may be placed upon the top of a freshly placed cake, and may be readily removed intact from the cake to which it has been applied.

Having fully described the invention, what I claim as new and desire to secure by Letters Patent is:

1. The method of making marzipan roses comprising the steps of forming a coil of cake decorative paste having a plurality of convolutions whose edges are scalloped, said paste consisting of sugar and ground almond paste, severing said coil transversely intermediate the ends thereof, resting one of the severed coil portions upon the severed end, and spreading the convolutions of said one severed portion laterally and in succession to form a marzipan rose.

2. The method of making marzipan roses comprising forming a strip of edible cake decorative paste having its side edges scalloped, said paste consisting of sugar and ground almond paste, rolling said strip backwardly to form a coil having a plurality of convolutions, severing said coil transversely intermediate the ends thereof, resting one of the severed coil portions upon the severed end, and spreading the convolutions of said one severed portion laterally and in succession to form a marzipan rose.

3. The method of making marzipan roses comprising forming a sheet of edible cake decorative paste, said paste consisting of sugar and ground almond paste, cutting from said sheet a strip having its side edges scalloped, rolling said strip backwardly to form a coil having a plurality of convolutions, severing said coil transversely intermediate the ends thereof, resting one of the severed coil portions upon the severed end, and spreading the convolutions of said one severed portion laterally and in succession to form a marzipan rose.

4. The method of making marzipan roses comprising forming a sheet of edible cake decorative paste, said paste consisting of sugar and ground almond paste, cutting from said sheet a strip having its side edges scalloped, rolling said strip backwardly to form a coil having a plurality of convolutions, severing said coil transversely intermediate the ends thereof to form two coil portions, resting each of said coil portions upon the severed end, and spreading the convolutions of each of said coil portions laterally and in succession to form marzipan roses.

References Cited in the file of this patent

"Encyclopedic Cookbook," by Ruth Berolzheimer, copyright 1948, published by Culinary Arts Institute, Chicago, distributed by Grosset & Dunlap, New York, pages 719, 720, 754 and 755.